United States Patent [19]
Horiguchi et al.

[11] Patent Number: 5,623,676
[45] Date of Patent: *Apr. 22, 1997

[54] COMPUTER PROGRAM PRODUCT AND PROGRAM STORAGE DEVICE FOR SAFING ASYNCHRONOUS INTERRUPTS

[75] Inventors: Tsuneo Horiguchi, San Jose; Eric L. Porter, Freemont, both of Calif.; Richard Tallman, Saugerties, N.Y.

[73] Assignee: International Business Machines Corporation, Armonk, N.Y.

[*] Notice: The term of this patent shall not extend beyond the expiration date of Pat. No. 5,513,349.

[21] Appl. No.: 468,990

[22] Filed: Jun. 6, 1995

Related U.S. Application Data

[62] Division of Ser. No. 216,932, Mar. 24, 1994, Pat. No. 5,513,349.

[51] Int. Cl.$^6$ .................................................. G06F 13/24
[52] U.S. Cl. ........................................... 395/735; 395/736
[58] Field of Search ........................................ 395/734, 733, 395/735, 736, 650

[56] References Cited

U.S. PATENT DOCUMENTS

| | | | |
|---|---|---|---|
| 5,210,828 | 5/1993 | Bolan et al. | 395/200 |
| 5,392,433 | 2/1995 | Hammersley et al. | 395/725 |

OTHER PUBLICATIONS

The Institue of Electrical and ElectronicsEngineers, Inc., *ANSI/IEEE Std 1003.1: Information Technology–Portable Operating System Interface [POSIX]: Part 1: System Application Program Interface (API) [C Language]*, First Edition 1990 (2–7).

The Institute for Electrical and Electronics Engineers, Inc., *IEEE Standard for Information Technology Portable Operating System Interface [POSIX]: Part 1: System Application Program Interface; Amendment 1: Realtime Extensions [C Language]*, Std. 1003.1b, 1993.

The Institute for Electrical and Electronics Engineers, Inc., IEEE Standards Interpretations for IEEE STd. 1003.1–1990 and IEEE Std. 2003.1–1992, (IEEE Computer Society, Oct. 11, 1994).

*Primary Examiner*—Jack B. Harvey
*Assistant Examiner*—Jeffrey K. Seto
*Attorney, Agent, or Firm*—Marilyn Smith Dawkins, Esq.; Sterne, Kessler, Goldstein & Fox P.L.L.C.

[57] ABSTRACT

Processing of an asynchronous signal directed to a thread comprising a software routine executing in a computer system such that data consistency is maintained is discussed. Such processing proceeds by determining whether the routine is signal safe such that processing of the routine may be interrupted in order to process the signal without possibly causing inconsistency of data. The routine is asynchronously interrupted and the signal is processed immediately if the routine is signal safe. If the routine is not signal safe, then the routine is not asynchronously interrupted and processing of the signal is deferred to a time when the signal may be processed without possibly causing inconsistency of data.

12 Claims, 8 Drawing Sheets

COMPUTER PROGRAM PRODUCT AND PROGRAM STORAGE DEVICE FOR SAFING ASYNCHRONOUS INTERRUPTS

This application is a division of application Ser. No. 08/216,932, filed Mar. 24, 1994, now U.S. Pat. No. 5,513,349.

CROSS-REFERENCE TO OTHER APPLICATIONS

The following application of common assignee contains some common disclosure, and is believed to have an effective filing date identical with that of the present application:

U.S. Patent Application entitled "Asynchronous Interrupt Safing of Prologue Portions of Computer Programs", by Tsuneo Horiguchi and Rick Tallman, Attorney Docket No. ST9-94-005, incorporated herein by reference in its entirety.

DESCRIPTION

1. Technical Field

The present invention relates to systems and methods for processing asynchronous interrupts such that consistency of data is maintained.

2. Background Art

Some computer systems support asynchronous interrupts of software routines, which may result from hardware or software events. Conventional procedures for processing asynchronous interrupts may result in rendering data inconsistent. For example, suppose that a routine executing in a computer system includes the following pseudocode segment:

Memory Location X←A; Instruction 1

B←Memory Location X; Instruction 2

Memory location X represents a storage location in a random access memory (RAM) of the computer system. Instruction 1 operates to store the value from variable A into memory location X. Instruction 2 operates to set the variable B equal to the value in memory location X. Suppose that the routine is interrupted by an asynchronous interrupt just after executing Instruction 1. If processing of this asynchronous interrupt operates to modify memory location X, then data in the RAM will become inconsistent. This is the case, since Instruction 2 of the routine expects the value of variable A to be stored in memory location X.

The example routine described above is not "interrupt safe". This is the case, since it cannot be asynchronously interrupted in order to process the interrupt without possibly causing data to become inconsistent.

One conventional approach for solving this problem involves analyzing the entire software application program, including functions which are implicitly invoked from the application program such as system services and/or language runtime library routines, to identify code segments which cannot be interrupted without possibly rendering data inconsistent (that is, which cannot be safely interrupted). Then, code is added to the application program to set and reset a flag at the entrance and exit, respectively, of each "unsafe" code segment. Thus, the flag is set when unsafe segments of the application program are executing, and reset when safe segments of the application program are executing. Whether or not asynchronous interrupts of the application program are processed depends on the value of the flag. Specifically, asynchronous interrupts are only processed if the flag is not set at the time of the interrupts.

This conventional approach, however, has a number of drawbacks. First, it is difficult to analyze the entire software application program to identify unsafe code segments, particularly functions which are implicitly invoked from the application program such as system services and/or language runtime library routines. Second, the performance of the application is degraded due to the setting and resetting of the flag. Note that such setting and resetting of the flag occurs regardless of whether the application program is actually interrupted. Third, existing software modules which are not interrupt safe cannot be used in a computing environment which employs this conventional approach since these modules typically do not contain any code to explicitly indicate which code segments are safe and not safe.

Thus, what is required is a system and method for processing asynchronous interrupts in a "safe" manner such that consistency of data is maintained.

DISCLOSURE OF INVENTION

The present invention is directed to a system and method of processing an asynchronous signal directed to a thread comprising a software routine executing in a computer system such that data consistency is maintained. The present invention operates by determining whether the routine is signal safe such that processing of the routine may be interrupted in order to process the signal without possibly causing inconsistency of data. The term "data" is broadly used herein and refers to information that may be in registers, random access memory, or external media, and that may be visible to the application program or may be internal to the implementation and not visible to the application program (such as information in internal control blocks managed by the language run time environment).

The routine is asynchronously interrupted and the signal is processed immediately if the routine is signal safe. If the routine is not signal safe, then the routine is not asynchronously interrupted and processing of the signal is deferred to a time when the signal may be processed without possibly causing inconsistency of data.

The present invention has a number of advantages. For example, the present invention minimizes the performance overhead required to safely process asynchronous interrupts. In particular, the present invention introduces performance overhead only when program execution is actually interrupted (recall that, according to the conventional approach described above, the flag is set and reset regardless of whether the application program is actually interrupted).

Also, the present invention does not require extensive changes to the application or the language environment code. Further, the present invention accommodates, without changes, existing modules that do not contain any explicit signal safing considerations.

The foregoing and other objects, features and advantages of the invention will be apparent from the following more particular description of preferred embodiments of the invention, as illustrated in the accompanying drawings.

BRIEF DESCRIPTION OF DRAWINGS

The present invention will be described with reference to the accompanying drawings, wherein:

FIGS. 7, 8A, 8B, 9A, and 9B are used to describe the present invention.

BEST MODE FOR CARRYING OUT THE INVENTION

1. Overview of the Present Invention

The present invention is directed to a system and method for processing asynchronous interrupts in a "safe" manner such that consistency of data is maintained. As described below, such asynchronous interrupts may be caused by software and/or hardware events called "signals". Thus, it can be said that the present invention is directed to a system and method for processing signals such that data consistency is maintained. In other words, the present invention is directed to a system and method for the "safing" of asynchronous interrupts and signals.

Figure 2:
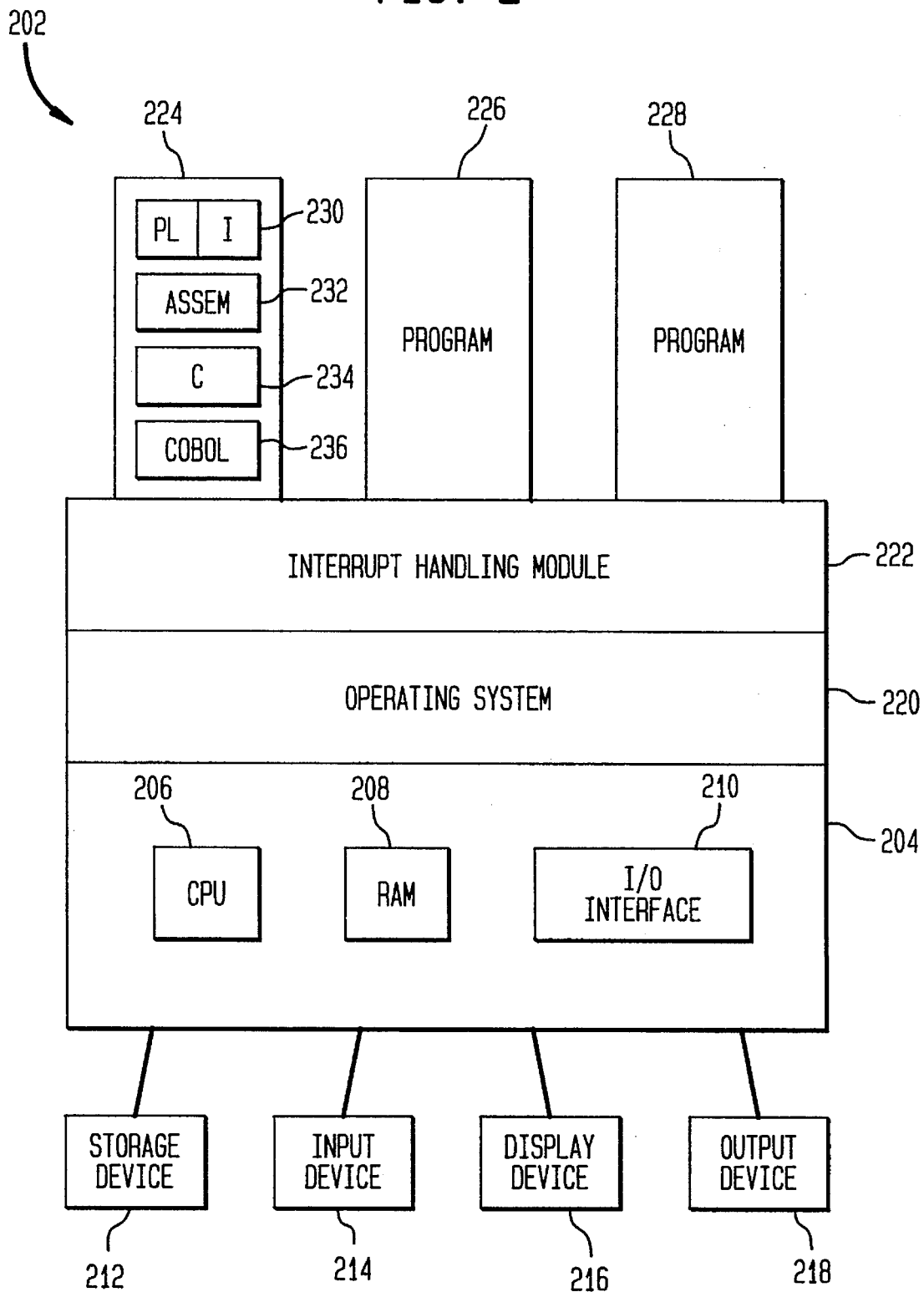
FIG. 2 is a block diagram of a computer system according to an embodiment of the present invention.

FIG. 2 is a block diagram of a computer system 202 according to an embodiment of the present invention. The computer system 202 includes hardware components 204 such as one or more central processing units (CPUs) 206, a random access memory (RAM) 208, and an input/output (I/O) interface 210. The RAM 208 is used to store, for example, invocation stacks (discussed below) associated with executing applications (that is, application programs which are executing in the computer system 202). The computer system 202 also includes an operating system 220. Various peripheral devices may be connected to the computer system 202, such as secondary storage devices 212 (such as hard disk drives), input devices 214 (such as keyboards and pointing devices), display devices 216 (such as monitors), and output devices 218 (such as printers).

Application programs 224, 226, and 228 preferably execute in parallel in the computer system 202. The application programs 224, 226, 228 may include a plurality of routines (also called modules, functions, and/or procedures) which are written in different computer programming languages. For example, application program 224 includes a routine 230 written in the well known PL/I language, a routine 232 written in assembly language which is specific to the computer system 202, a routine 234 written in the well known C language, and a routine 236 written in the well known Cobol language.

The computer system 202 also includes an interrupt handling module 222. Preferably, the interrupt handling module 222 implements the method of the present invention as described herein.

The interrupt handling module 222 can be implemented in any number of ways. For example, the interrupt handling module 222 can be implemented as an extension of the operating system 220 (in which case the interrupt handling module 222 would be part of the operating system 220). Alternatively, the interrupt handling module 222 can be embedded in the run-time environment (not shown) of the application programs 224, 226, 228 which execute in the computer system 202. Alternatively, the interrupt handling module 222 can be implemented as an extension of a combination of the operating system 220 and the run-time environment. The interrupt handling module 222 could also be implemented as an application program which executes in the computer system 202, such as application program 228. These and other implementations of the interrupt handling module 222 will be apparent to persons skilled in the relevant art based on the description of the interrupt handling module 222 contained herein.

A computer program product comprising a computer readable media having computer program logic recorded thereon, wherein the computer program logic when executed in the computer system 202 enables the computer system 202 to implement the method of the present invention, may be read by and stored on the secondary storage device 212. The computer program logic may then be loaded into the RAM 208, and executed by the CPU 206 of the computer system 202. When executing in the CPU 206, the computer program logic is represented by the interrupt handling module 222.

The system of the present invention is represented by the computer system 202 having the interrupt handling module 222 either as part of or distinct from the operating system 220. Alternatively, the system of the present invention is represented by the interrupt handling module 222 alone. Or, the system of the present invention is represented by the computer program product. Other representations of the present invention will be apparent to persons skilled in the relevant art based on the discussion contained herein.

Preferably, the computer system 202 is the well known system/390 family of computers produced by International Business Machines (IBM) Corporation of Armonk, N.Y. Preferably, a run-time environment is established in the computer system 202 using the well known SAA AD/Cycle Language Environment/370 produced by IBM (SAA stands for Systems Application Architecture; AD stands for Application Development). However, it should be understood that other computers and/or run-time environments could alternatively be used in the computer system 202 without departing from the scope and spirit of the present invention. System/390, SAA, and AD/Cycle are registered trademarks of International Business Machines Corporation.

2. Overview of the POSIX Operating System Interface Standard

An operating system interface standard is a specification that defines the interface between operating systems which conform to the standard and application programs which are written to comply with the standard. Operating system interface standards are advantageous for a number of reasons, including enhanced portability. For example, applications which conform to an operating system interface standard are theoretically portable at the source code level to all computer systems having operating systems which conform to the standard.

Operating system interface standards differ from computer programming language standards. A computer programming language standard is a specification which defines the syntax and operation of a computer programing language. Various computer programing language standards exist, such as the ANSI and ISO standards for the C, COBOL, Fortran, and PL/1 computer programming languages. The application programs 224, 226, 228 which execute in the computer system 202 in FIG. 2 each includes components which conform to one or more of these computer programming language standards.

Preferably, the operating system 220 in the computer system 202 is one which conforms to the Portable Operating System Interface (POSIX) standard. The POSIX standards relevant to the present invention are defined in terms of the well known C computer programing language. POSIX, which is a UNIX based operating system interface standard, is described in many publicly available documents, such as *Information Technology-Portable Operating System Interface* (POSIX)—Part 1: *System Application Program Interface (C Language)* (API), published by the Institute of Electrical and Electronics Engineers, International Standard ISO/IEC 9945-1:1990, IEEE Standard 1003.1-1990, 1990, and *Draft Standard for Information Technology—Portable Operating System Interface (POSIX)*—Part 1: *System Application Program Interface (API)—Amendment 2: Threads Extension (C Language)*, published by the Institute of Electrical and Electronics Engineers, IEEE Standard P1003.4a/ D8, 1993, which are herein incorporated by reference in their entireties.

Specifically, the operating system 220 is preferably the well known MVS/ESA (Multiple Virtual Storage System/ Enterprise Systems Architecture) operating system produced by IBM. It should be understood, however, that other operating systems based on other operating system interface standards could alternatively be used without departing from the scope and spirit of the present invention. In particular, any operating system which supports asynchronous interrupts and the processing of such interrupts, could alternatively be used. This includes other UNIX based standards, specifications, or implementations. MVS/ESA is a trademark of International Business Machines Corporation. UNIX is a registered trademark of UNIX System Laboratories, Inc.

Features of POSIX which are relevant to the present invention shall now be generally described. These features of POSIX are well known. They are discussed below for the convenience of the reader.

POSIX supports the following program execution constructs: processes and threads. A process is defined as including an address space, one or more threads that execute within that address space, and the system resources required by the threads. An application program includes one or more processes. A thread is defined as being a single flow of control within a process. Each thread has its own required resources to support its flow of control. A thread includes one or more executing routines.

A signal (also called a condition, an exception, and an error) is an interprocess message that is typically transferred via an interprocess communication (IPC) mechanism to a thread (called the receiving thread) that is executing in the computer system 202. The signal may originate from an entity that is external to the receiving thread (such as another thread or the operating system 220), or may originate from the receiving thread itself. An example of a signal is a "Divide By Zero" signal, which is sent to a thread when the thread attempts to perform a division operation with the divisor equal to zero.

POSIX supports a particular set of signals (such signals are called POSIX signals), and defines particular semantics for handling POSIX signals. Such semantics are called "POSIX signal handling semantics".

According to the POSIX signal handling semantics, signals are defined as being asynchronous. In contrast, traditional language signal handling semantics define signals as being synchronous. Asynchronous signals can best be described by first describing synchronous signals.

A synchronous signal is one whose origin can be attributed to a specific thread (this is called the originating thread), wherein the originating thread and the receiving thread (that is, the thread which received the signal from the originating thread) execute synchronously. In other words, with synchronous signals, the execution of the originating thread is suspended while the receiving thread is processing the signal.

These assumptions pertaining to synchronous signals do not apply to asynchronous signals. In particular, the execution of the originating thread is not suspended while the receiving thread is processing the signal. In contrast, with asynchronous signals, the originating thread and the receiving thread execute in parallel while the receiving thread is processing the signal.

A POSIX asynchronous signal represents an asynchronous event. When a thread receives an asynchronous signal, the thread is said to have been asynchronously interrupted. Interrupt service routines (ISR) are defined for processing asynchronous signals. ISRs may be user-defined, or may be defined by the language execution environment and/or the operating system environment.

POSIX defines functions for blocking and unblocking signals. For example, a routine can be written by a computer programmer to include a call to a POSIX function to block signals, such that all signals directed to the thread which includes the routine are blocked (and held pending for later delivery when unblocked) and the routine cannot be asynchronously interrupted. A routine can be written by a computer programmer to include a call to a POSIX function to unblock signals, such that signals directed to the thread that includes the routine are not blocked and the routine can be asynchronously interrupted.

3. Brief Description of Invocation Stacks

Before proceeding further, it will be useful to briefly describe invocation stacks.

Conventionally, an invocation stack is associated with each application program. An invocation stack is a last-in-first-out (LIFO) stack (which may be implemented as a linked list). The elements of an invocation stack are called stack frames. Each stack frame is associated with an invocation of a function.

Figure 6:
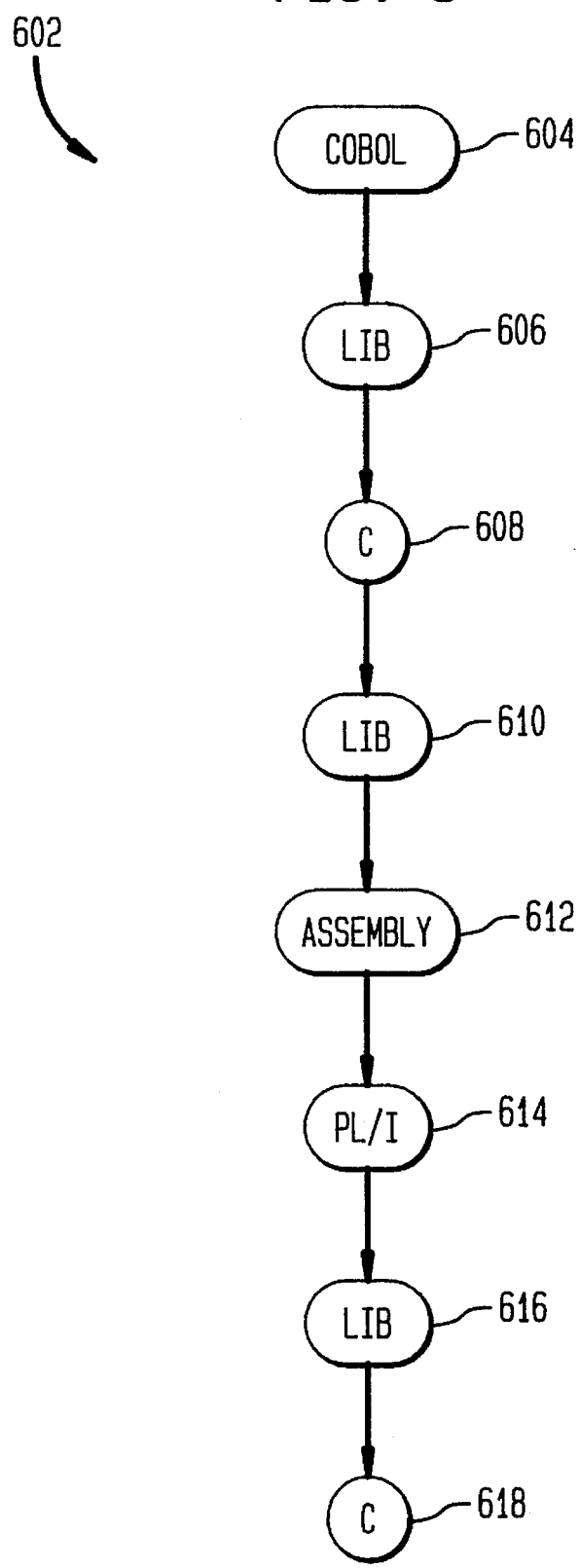
FIG. 6 is an example routine invocation sequence used for describing the present invention.

For example, FIG. 6 is a routine invocation sequence 602 where a Cobol routine 604 has invoked a C routine 608. The statement in the Cobol routine 604 which invokes the C routine 608 typically operates to invoke a library (lib) routine 606, which then invokes the C routine 608 (although the intermediate invocation of the library routine 606 is transparent to the users who wrote and executed the Cobol and C routines 604, 608). Thus, FIG. 6 shows the Cobol routine 604 invoking the library routine 606, which invokes the C routine 608.

It is noted that function invocations contained in routines that are written in higher-level languages ordinary operate in the manner described above, where the function invocations operate to invoke library routines, which in turn invoke the routines specified in the original function invocations. Thus, in FIG. 6 it is shown that the C routine 608 invokes an assembly language routine 612 via a library routine 610.

The assembly language routine 612 invokes a PL/I routine 614 (note that the assembly language routine 612 is not considered to be written in a higher-level language; it directly invokes the PL/I routine 614). The PL/I routine 614 invokes a second C routine 618 via a library routine 616.

It is noted that the Cobol routine 604, the C routines 608 and 618, and the assembly routine 612 may be part of one of the application programs 224, 226, or 228. The library routines 606, 610, and 616 are part of the run-time environment (not shown) of the application programs 224, 226, 228 which execute in the computer system 202.

Figure 7:
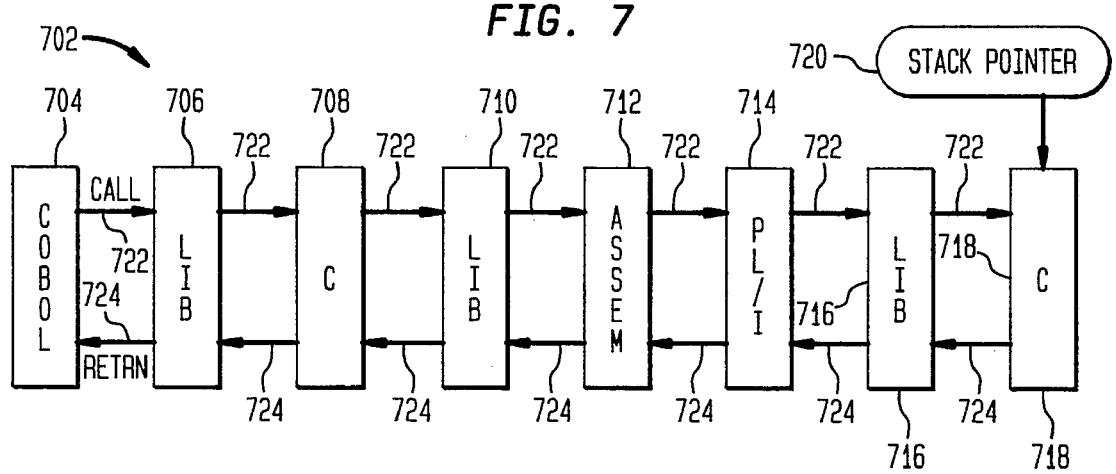
FIGS. 7, 8A, 8B, 9A, and 9B are example invocation stacks corresponding to the example invocation sequence of FIG. 6.

FIG. 7 illustrates an invocation stack 702 which corresponds to the invocation sequence 602 of FIG. 6. The invocation stack 702 includes stack frames 704, 706, 708, 710, 712, 714, 716, and 718 which correspond to the invocations of routines 604, 606, 608, 610, 612, 614, 616, and 618, respectively. The stack frame 718 for the C routine 618 is at the top of the invocation stack 702, as indicated by a stack pointer 720.

In all invocation stacks shown herein, "call" invocation flow arrows 722 are included which indicate the calling invocation sequence. For example, based on the invocation flow arrows 722 in the invocation stack 702 of FIG. 7, it is apparent that the Cobol routine 704 has called the library routine 706, which has called the C routine 708, etc.

Also, in all invocation stacks shown herein, "return" or "retrn" flow arrows 724 are included which indicate the return sequence. For example, based on the return arrows 724 in the invocation stack 702 of FIG. 7, it is apparent that, after it completes, the C routine 718 returns to the library routine 716, which returns to the PL/I routine 714, etc.

Figure 8A:
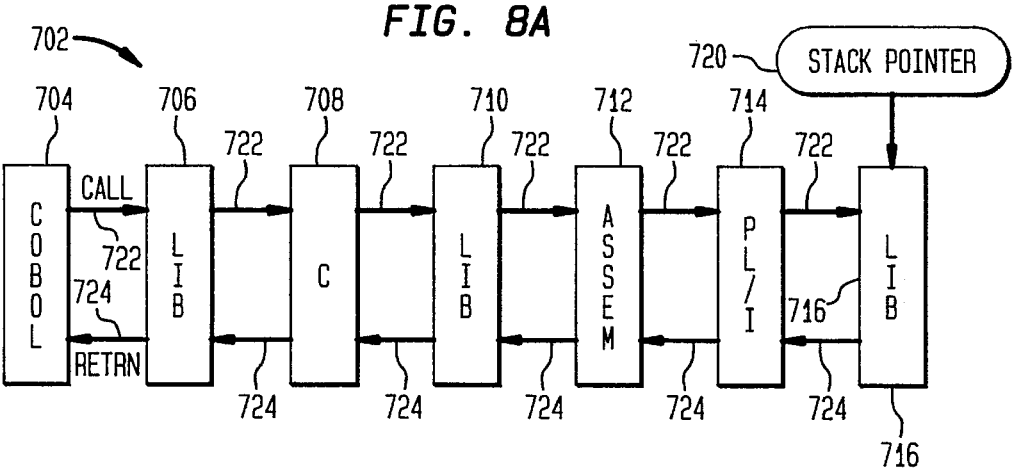

A stack frame is added to an invocation stack when a function is invoked. Similarly, a stack frame associated with a function is removed from the invocation stack when the function returns to its caller. This is shown, for example, in FIG. 8A, which shows the invocation stack 702 of FIG. 7 after the C routine 618 has returned to its caller, the library routine 616. In FIG. 8A, the stack frame 718 for the C routine 618 has been removed from the invocation stack 702.

A function uses its stack frame to store its dynamic variables. Also, when one function (referred to as the "calling" function) calls another function (referred to as the "called" function), the state of the calling function is stored in its stack frame.

For purposes of the present invention, data associated with a called routine (that is, a routine that is invoked by a calling routine) is in a consistent state at the return boundary between the called routine and the calling routine. However, data associated with the calling routine is not necessarily in a consistent state at the return boundary between the called routine and the calling routine. For example, in the invocation sequence 602 shown in FIG. 6, data associated with the C routine 618 (that is, the called routine) is in a consistent state when the C routine 618 returns to the library routine 616 (that is, the calling routine). However, data associated with the library routine 616 is not necessarily in a consistent state at this time.

Since an invocation stack directly corresponds to the invocation sequence of routines, it can also be said that a called routine's data is in a consistent state between stack frames in the return mechanism of an invocation stack. For example, in the stack frame 702 of FIG. 7, data associated with the C routine 618 is in a consistent state during the period when the stack frame 718 is popped and removed from the invocation stack 702, and when the stack frame 716 is made to be the new top of the invocation stack 702.

4. Operation of the Present Invention

The operation of the interrupt handling module 222 according to a preferred embodiment of the present invention shall now be discussed with reference to a flowchart 102 shown in FIG. 1. This flowchart 102 is of sufficient detail to enable one skilled in the relevant art to generate a computer program or a computer program product in accordance with the present invention. This is true of all flowcharts presented and discussed herein. The flowchart 102 is described from the perspective of the interrupt handling module 222, which is handling an asynchronous signal which caused a routine to be interrupted. The flowchart 102 begins with step 104, where control immediately passes to step 106.

In step 106, the interrupt handling module 222 determines whether the routine is "signal safe". In other words, during step 106 the interrupt handling module 222 determines whether the routine may be asynchronously interrupted in order to process the signal without possibly causing data to become inconsistent. Step 106 is discussed in greater detail in a section below.

If the interrupt handling module 222 determines in step 106 that the routine is "signal safe", then step 108 is performed. In step 108, the interrupt handling module 222 causes the signal to be processed. As discussed above, interrupt service routines (ISR) are defined for processing asynchronous signals. ISRs may be user-defined, or may be defined by the language execution environment and/or the operating system environment. In step 108, the interrupt handling module 222 invokes the interrupt service routine associated with the signal in order to process the signal.

Figure 1:
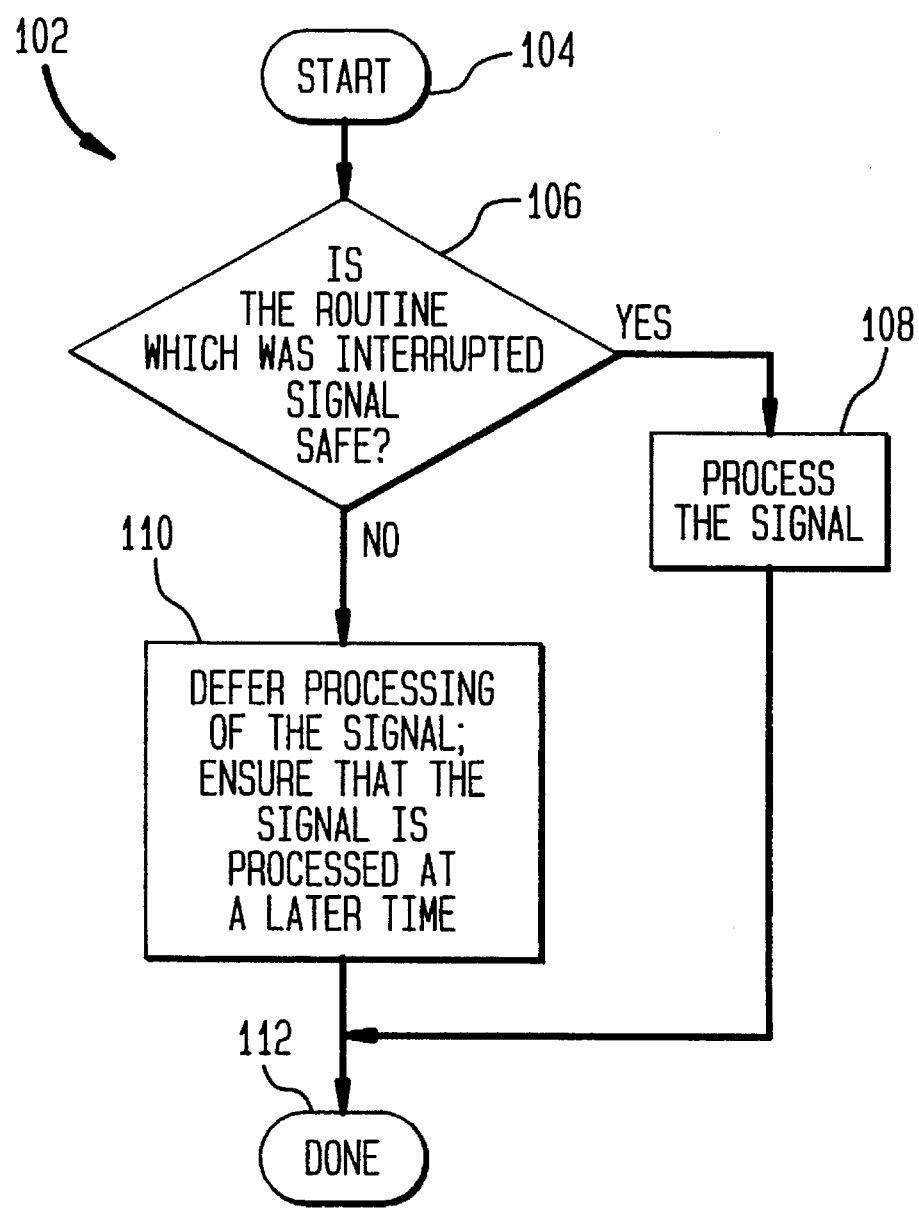
FIGS. 1, 3, 4, and 5 are flowcharts which depict the preferred operation of the present invention.

The operation of the interrupt handling module 222 according to the flowchart 102 in FIG. 1 is complete after step 108 is performed, as indicated by step 112.

Returning to step 106, if the interrupt handling module 222 determines that the routine is not "signal safe" then step 110 is performed. In step 110, the interrupt handling module 222 defers processing of the signal to a later time when processing of the signal will not possibly cause data to become inconsistent. Step 110 is discussed in greater detail in a section below.

The operation of the interrupt handling module 222 according to the flowchart 102 in FIG. 1 is complete after step 110 is performed, as indicated by step 112.

5. Determining Whether the Routine Is "Signal Safe"

As discussed above, in step 106 of the flowchart 102 in FIG. 1, the interrupt handling module 222 determines whether the routine (that received the signal) is "signal safe". The manner in which the interrupt handling module 222 operates while processing step 106 shall now be described in greater detail.

The interrupt handling module 222 preferably performs step 106 at the granularity of a routine. In other words, the interrupt handling module 222 determines whether the routine that is to be asynchronously interrupted by the signal is signal safe (that is, the routine that will be interrupted by the signal if processing of the signal is not deferred in step 110, described below). A routine is defined herein as being an invocation instance of a program unit, where a program unit (called a "called program unit" for reference purposes) may be called or invoked by another program unit (called a "calling program unit" for reference purposes) in such a way that the called program unit can return to the calling program unit. This invocation and return sequence is accomplished via a call command and a return command, respectively.

Preferably, the interrupt handling module 222 determines whether the routine (that is to be asynchronously interrupted by the signal) is signal safe based on the characteristics and/or attributes of the routine. Which characteristics of the routine which are considered by the interrupt handling module 222 vary from implementation to implementation.

Preferably, the characteristics of the routine which are considered by the interrupt handling module 222 in step 106 include the following: (1) whether the routine is user written application code, is language run time library code, or is part of other services invoked directly or indirectly from user written application code; and (2) the programming language of the routine.

In particular, according to the present invention, all routines that represent language run time library code are not considered to be signal safe.

Additionally, all user written application routines (that is, non-language run time library code) that are written in a computer programming language that complies with the POSIX standard are considered to be signal safe. As discussed above, POSIX defines commands which can be entered into computer programs by computer programmers for blocking and unblocking signals. Computer programmers may employ such POSIX commands to protect "unsafe" portions of computer programs (that is, to disable interrupts in portions of computer programs which, if asynchronously interrupted, might possibly cause data to become inconsistent). The present invention assumes that these POSIX commands have been used to protect all unsafe portions of computer programs from asynchronous interrupts, and thus all user written application routines that are written in a POSIX conforming computer programming language are considered to be signal safe.

Thus, more generally, any user written application routine that capable of blocking and unblocking signals is considered to be signal safe. Or, any user written application routine that is capable of enabling and disabling asynchronous interrupts is considered to be signal safe.

Note that a user written application routine that is written in a POSIX conforming computer programming language is considered to be signal safe, even if the computer programmer has not used the relevant POSIX commands to protect unsafe portions of the routine. This aspect of the present invention enables the computer programmer to select the granularity of asynchronous safing based on the trade-off of maximizing the opportunities to safely handle asynchronous interrupts against the need to disable and enable interrupts more frequently.

The present invention considers the C computer programming language to conform with the POSIX standard (this is the case since, as noted above, the POSIX standards relevant to the present invention are defined in terms of the C computer programming language). Thus, all user written application routines that are written in the C computer programing language are considered to be signal safe.

Other computer programing languages such as Cobol, assembly, and PL/I are not considered to conform to the POSIX standard. Thus, all user written application routines that are written in the Cobol, assembly, and PL/I computer programing languages are not considered to be signal safe.

It should be understood, however, that Cobol, assembly, PL/I, and other computer programing languages may in fact be POSIX conforming based on their particular implementations. In this case, user written application routines written in these languages would be considered to be safe by the present invention. Thus, the determinations made by the interrupt handling module 222 during step 106 of flowchart 102 in FIG. 1 are implementation dependent.

Preferably, the interrupt handling module 222 determines whether the routine is user written application code, is language run time library code, or is part of other services invoked directly or indirectly from user written application code, and identifies the programming language of the routine, using any number of well known procedures. For example, the interrupt handling module 222 may scan the routine itself for information pertaining to these characteristics and attributes. Alternatively, or in addition to the above, the interrupt handling module 222 may access the stack frame in the invocation stack associated with the routine to extract information contained therein pertaining to these characteristics and attributes. Other procedures for determining these characteristics and attributes of the routine will be apparent to persons skilled in the relevant art.

If these characteristics and attributes of the routine cannot be determined by the interrupt handling module 222, then the interrupt handling module 222. concludes that the routine is not signal safe.

The operation of the present invention as described in this section shall now be further discussed with regard to the example invocation sequence 602 shown in FIG. 6. Suppose that the C routine 608 (or the C routine 618) is asynchronously interrupted. In step 106 of the flowchart 102 of FIG. 1, the interrupt handling module 222 determines that the C routine 608 is signal safe. Thus, the interrupt handling module 222 causes the signal to be immediately processed, as indicated by step 108.

Suppose that a non-C routine, such as the Cobol routine 604, the assembly routine 612, or the PL/I routine 614, is asynchronously interrupted. In step 106 of the flowchart 102 of FIG. 1, the interrupt handling module 222 determines that this non-C routine 604, 612, or 614 is not signal safe. Thus, the interrupt handling module 222 defers processing of the signal, as indicated by step 110.

Suppose that a library routine 606, 610, or 616 is asynchronously interrupted. In step 106 of the flowchart 102 of FIG. 1, the interrupt handling module 222 determines that this library routine 606, 610, or 616 is not signal safe. Thus, the interrupt handling module 222 defers processing of the signal, as indicated by step 110.

6. Deferring Processing of the Signal

As discussed above, in step 110 of the flowchart 102 in FIG. 1 the interrupt handling module 222 defers processing of the signal to a later time. The manner in which the interrupt handling module 222 operates while processing step 110 shall now be described with reference to a flowchart 302 in FIG. 3. The flowchart 302 begins with step 304, where control immediately passes to step 306.

In step 306, the interrupt handling module 222 accesses the invocation stack (called the "active invocation stack" or the "active stack") associated with the routine which is to be interrupted by the signal (that is, the routine that will be interrupted by the signal if the signal is not returned to the operating system in step 312, described below) and determines whether any of the routines corresponding to the stack frames in the active stack are signal safe (the procedure for determining whether a routine is signal safe is discussed in the preceding section).

For example, consider the invocation stack 702 shown in FIG. 8A which corresponds to the invocation sequence 602 shown in FIG. 6. Note, however, that the stack frame 702 shown in FIG. 8A reflects a state of the invocation sequence 602 after the C routine 618 has returned to its caller, the library routine 616. Assume that the library routine 616 has been asynchronously interrupted. In this example, the interrupt handling module 222 in step 306 searches through the invocation stack 702 of FIG. 8A and locates the C routine 708, which is signal safe.

After performing step 306, the interrupt handling module 222 in step 308 determines whether a signal safe routine was found in the active stack. If a signal safe routine was found in step 306, then step 310 is processed. Otherwise, step 316 is processed.

In step 310, the interrupt handling module 222 logically inserts a stub routine into the return mechanism of the active stack just prior to the return to the most recent signal safe routine identified in step 306. When it is invoked, the stub routine polls for and processes any pending signals. However, the stub routine is not invoked until just prior to the invocation of the most recent signal safe routine identified in step 306. Thus, the present invention has effectively deferred processing of the signal until a later time when processing of the signal will not possibly cause data to become inconsistent.

Figure 8B:
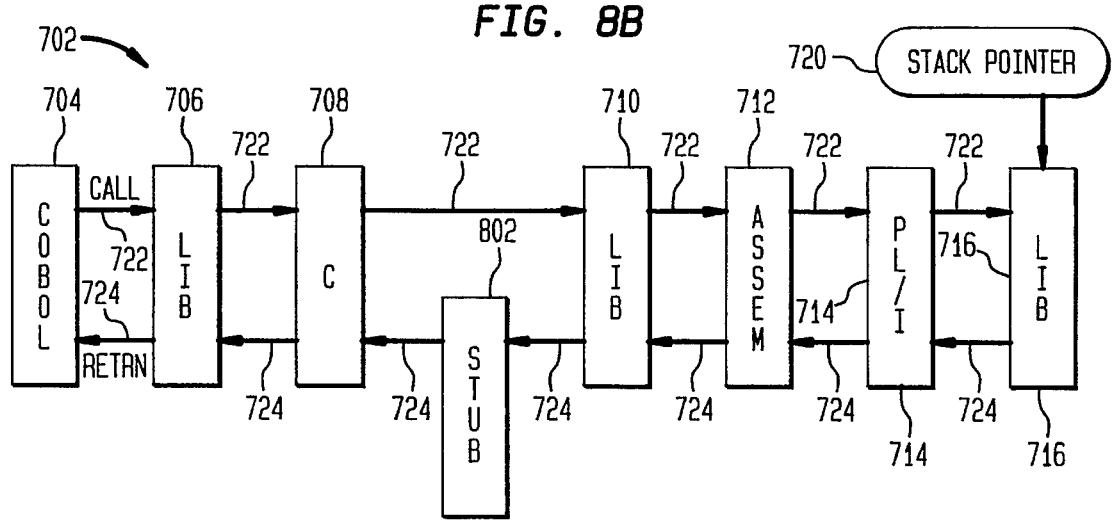

For example, FIG. 8B shows the invocation stack 702 of FIG. 8A after it has been modified in accordance with step 310. Recall that the signal safe C routine 708 was identified in step 306. In step 310, the interrupt handling module 222 inserts a stub routine 802 into the active stack 702 just prior to the return to the C routine 708. AS a result, the library routine 710 returns to the stub routine 802, rather than the C routine 708. After processing any pending signals, the stub routine 802 returns to the C routine 708.

By inserting the stub routine between stack frames in the return mechanism of the active stack, the present invention ensures that pending signals are processed only when data associated with the called routine is in a consistent state. This is the case since, as discussed above, data associated with a called routine is in a consistent state between stack frames in the return mechanism of an invocation stack. Also, by inserting the stub routine into the active stack just prior to the return to the closest signal safe routine identified in step 306, the present invention ensures that the data associated with the calling routine (that is, the closest signal safe routine identified in step 306) will not be made inconsistent by processing of the signal by the stub routine since, according to the present invention, the calling routine is signal safe.

After processing step 310, the interrupt handling module 222 in step 312 returns the signal to the operating system 220. The returned signal then becomes a pending signal.

Figure 4:
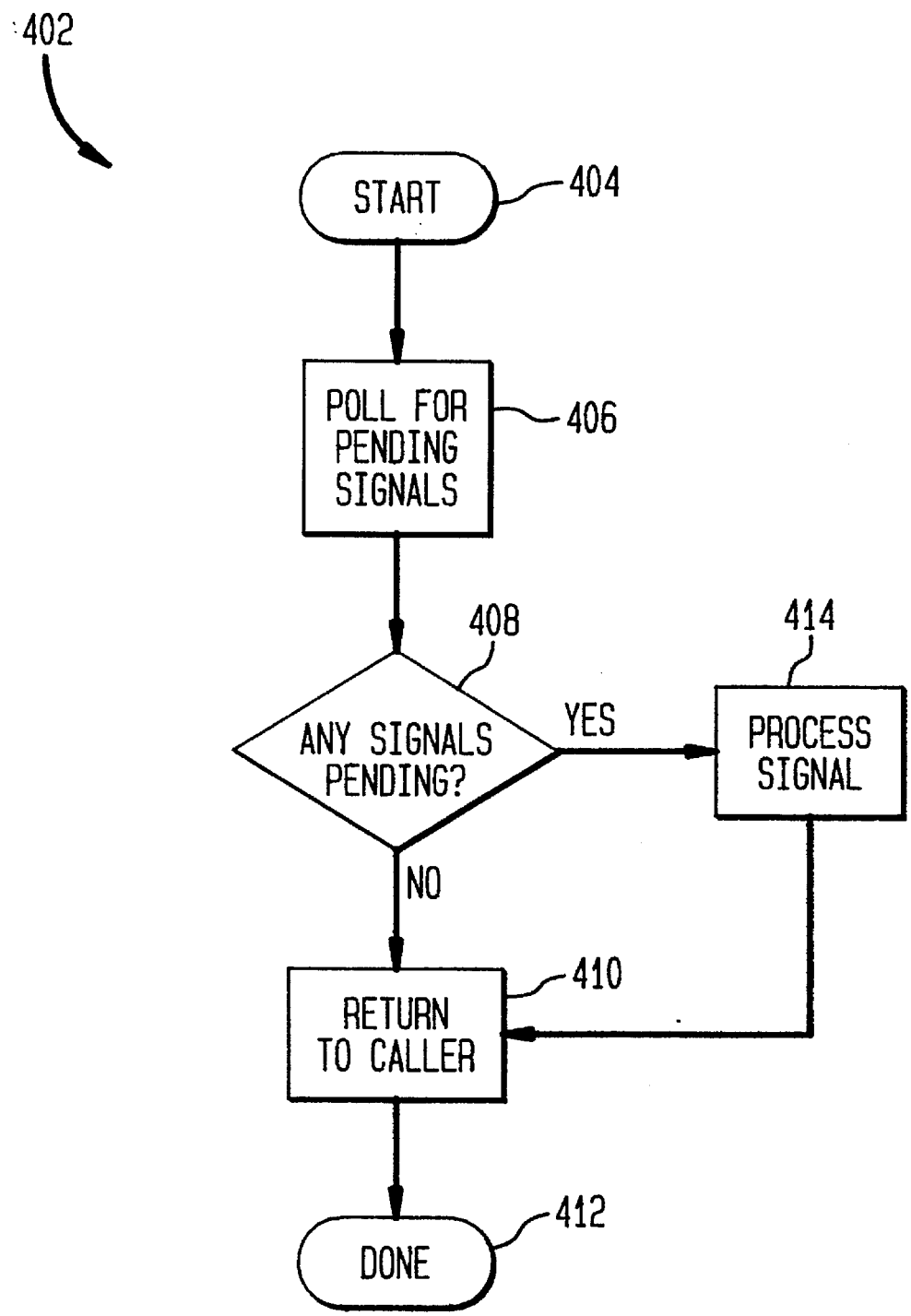

As discussed above, and as shall now be further discussed with reference to a flowchart 402 in FIG. 4, the stub routine (that was added to the active stack in step 310) when invoked polls the operating system 220 for any pending signals (additional signals may have been returned to the operating system 220 prior to and after the return of the signal currently being discussed). This is represented by step 406. If any signals were pending (step 408), then the stub routine processes the signals by invoking the interrupt service routines that are respectively associated with the signals (step 414). If no Signals were pending (step 408), then the stub routine returns to the caller routine (step 410). In the example invocation stack 702 of FIG. 8B, the stub routine 802 returns to the C routine 708.

Figure 9A:
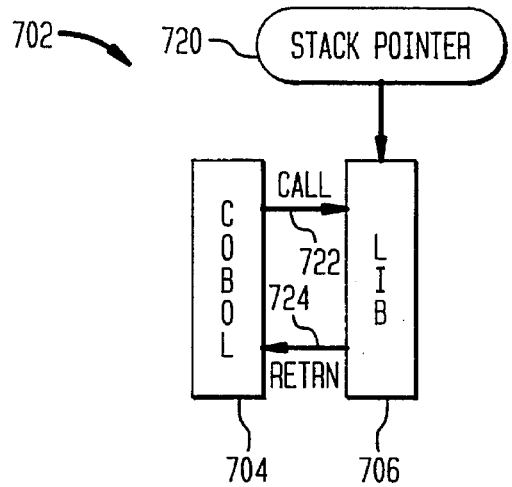

Returning to step 308, if the interrupt handling module 222 in step 308 did not find a signal safe routine in the active stack, then step 316 is processed. For example, consider the invocation stack 702 shown in FIG. 9A which corresponds to the invocation sequence 602 shown in FIG. 6. Note, however, than the stack frame 702 shown in FIG. 9A reflects a state of the invocation sequence 602 after the C routine 608 has returned to its caller, the library routine 606.

Assume that the library routine 606 has been asynchronously interrupted. In this example, the interrupt handling module 222 in step 306 searches through the invocation stack 702 of FIG. 9A and finds the stack frames 704 and 706 for the Cobol routine 604 and the library routine 606, respectively. However, the Cobol routine 604 and the library routine 606 are not signal safe. Thus, the interrupt handling module 222 processes step 316 since it did not find a signal safe routine in the active stack 702.

Figure 10A:
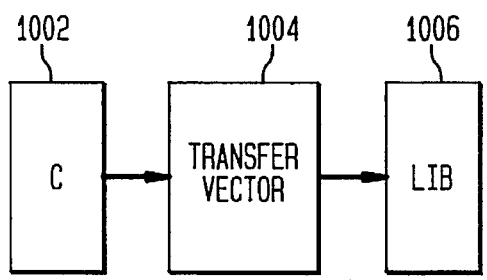
FIGS. 10A and 10B illustrate the manner in which a C routine invokes a library routine.

Before discussing step 316 in detail, it will be useful to briefly discuss the manner in which a C routine calls a library routine. As shown in FIG. 10A, a C routine 1002 conventionally calls a library routine 1006 (such as a "print" function) via a well known transfer vector 1004 (also called a "library invocation mechanism"). The transfer vector 1004 is part of the run-time environment and is conceptually a look-up table that contains address information pertaining to library routines, such as the library routine 1006. The C routine 1002 accesses the transfer vector 1004 to obtain library address information, and then uses this library address information to invoke the desired library routine 1006. A particular transfer vector 1004 is assigned to all C routines, such that whenever any C routine attempts to invoke any library function, this particular transfer vector 1004 is accessed.

Figure 3:
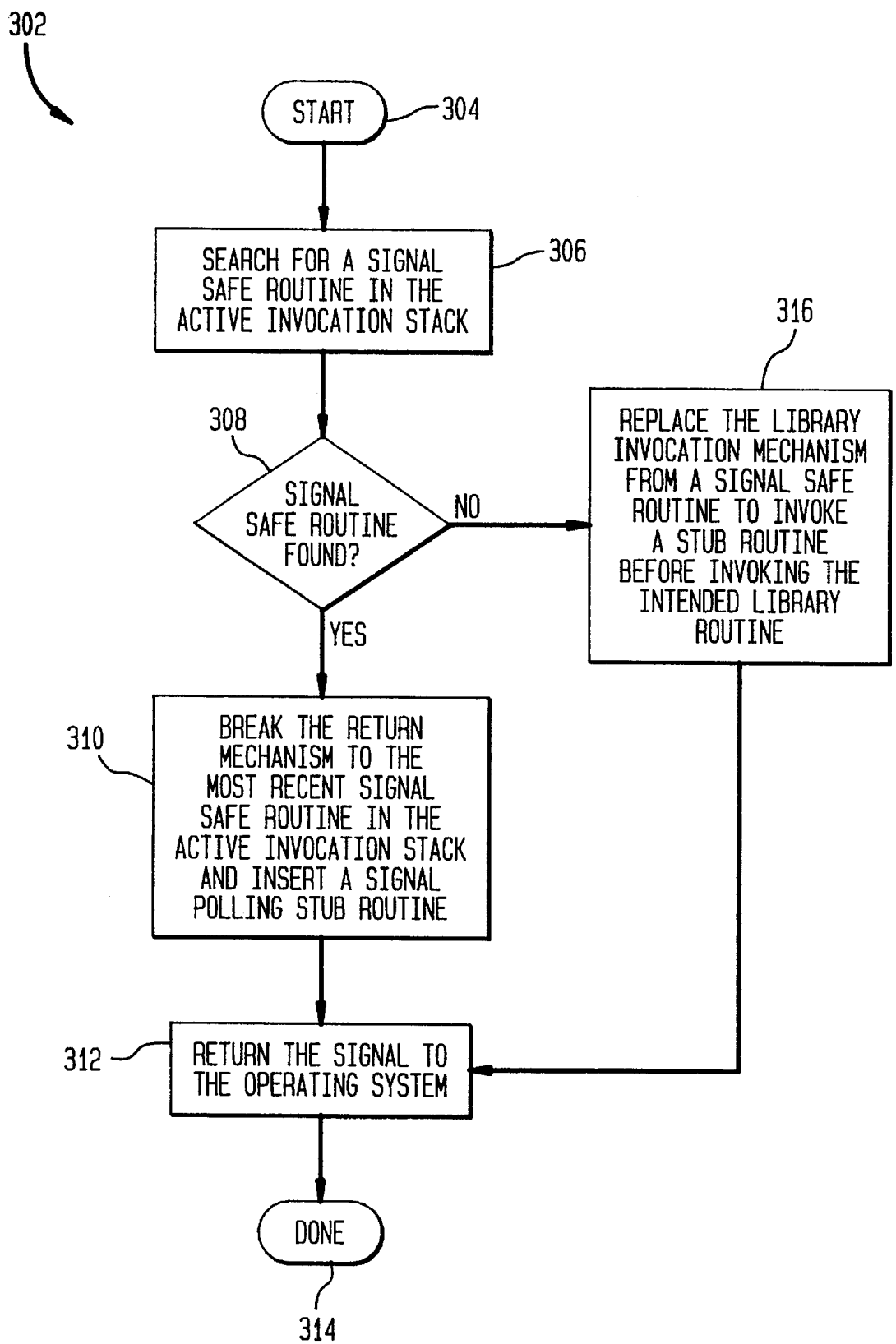

Returning now to the flowchart 302 in FIG. 3, in step 316 the interrupt handling module 222 modifies the transfer vector 1006 associated with C routines such that a stub routine will be invoked whenever any C routine attempts to access a library routine. When it is invoked, the stub routine polls for and processes any pending signals. However, the stub routine is not invoked until a C routine attempts to access a library routine. Thus, the present invention has effectively deferred processing of the signal until a later time when processing of the signal will not possibly cause data to become inconsistent.

Figure 10B:
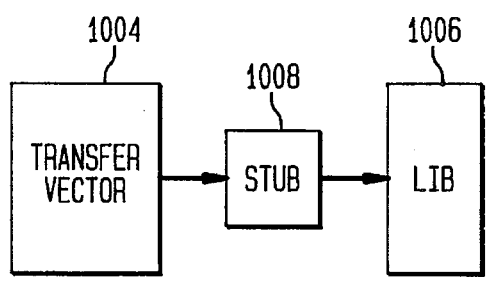

For example, consider FIG. 10B which shows the transfer vector 1004 and the library routine 1006 first introduced in FIG. 10A. After step 316 is processed, the transfer vector 1004 has been modified so that a stub routine 1008 is invoked prior to the invocation by any C routine of any library routine, such as library routine 1006. Such modification of the transfer vector 1004 may be achieved, for example, by changing the address information contained in the transfer vector 1004 such that address information identifying the stub routine 1008 (rather than the library routine 1006) is returned whenever any C routine attempts to invoke the library routine 1006.

Note that the deferred signal will not be processed unless (1) a C routine is called in the future in the invocation sequence containing the Cobol routine 604, and (2) this C routine attempts to invoke a library routine. For example, consider again the invocation stack 702 shown in FIG. 9A that corresponds to the invocation sequence 602 shown in FIG. 6 (recall that the stack frame 702 shown in FIG. 9A reflects a state of the invocation sequence 602 after the C routine 608 has returned to its caller, the library routine 606).

If the library routine 606 returns to the Cobol routine 604, and the Cobol routine 604 either terminates or never directly or indirectly invokes another C routine, then the deferred signal may never be processed. Even if the Cobol routine 604 does invoke another C routine, the deferred signal will not be processed if the C routine does not attempt to invoke a library function.

Figure 9B:
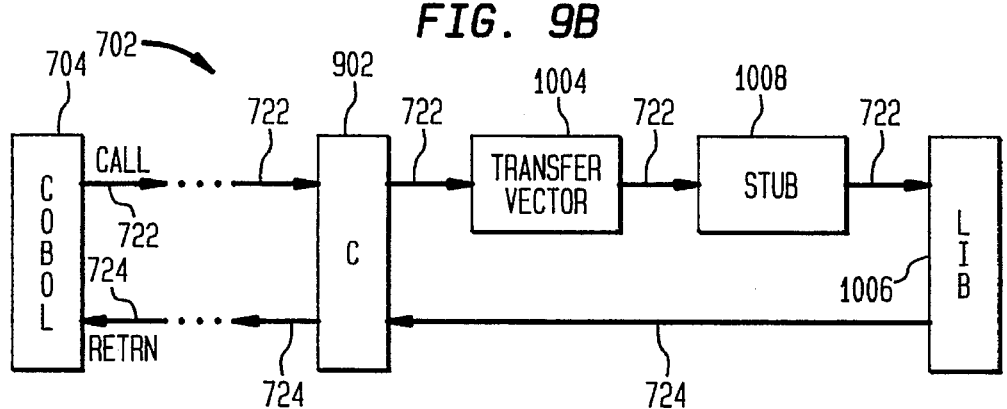

As shown in an example invocation stack 702 shown in FIG. 9B, however, if the Cobol routine 704 either directly or indirectly calls a new C routine corresponding to a new stack frame 902 (this new C routine may be the same as or different from one of the C routines 608, 618 shown in FIG. 6), and if this new C routine attempts to invoke a library routine 1006, then the transfer vector 1004 modified by operation of the interrupt handling module 222 in step 316 of FIG. 3 will ensure that the stub routine 1008 will be invoked to process the deferred signal.

After processing step 316, the interrupt handling module 222 in step 312 returns the signal to the operating system 220. The returned signal then becomes a pending signal.

Figure 5:
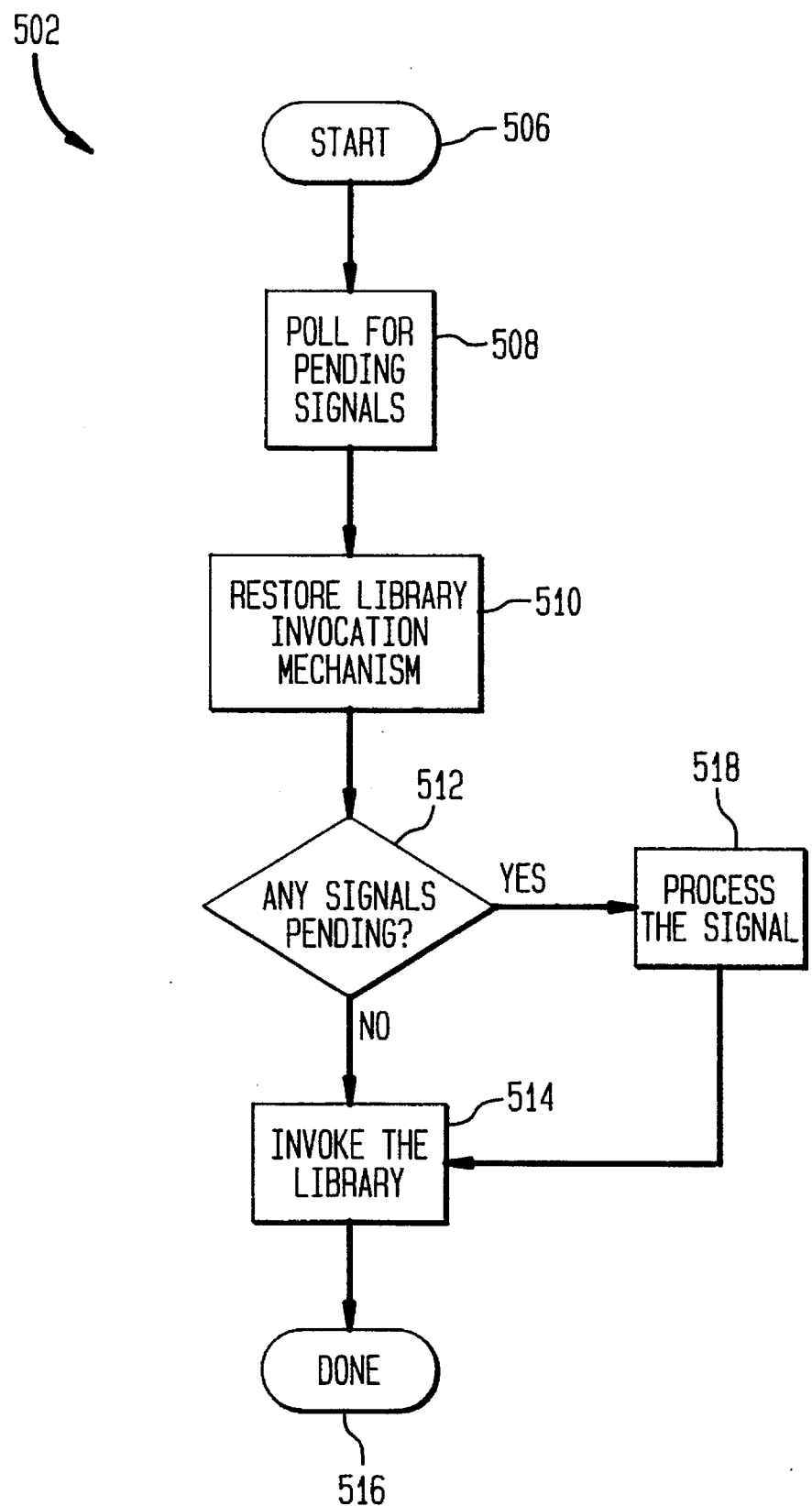

As discussed above, and as shall now be further discussed with reference to a flowchart 502 in FIG. 5, the stub routine (that was added to the transfer vector in step 316) when invoked polls the operating system 220 for any pending signals (additional signals may have been returned to the operating system 220 prior to and after the return of the signal currently being discussed). This is represented by step 508.

The stub routine then restores the transfer vector associated with C routines to its state prior to the processing of step 316 in FIG. 3. This is represented by step 510. In other words, during step 510, the stub routine modifies the transfer vector associated with C routines such that the stub vector is not invoked the next time that a C routine attempts to invoke a library function.

If any signals were pending (step 512), then the stub routine processes the signals by invoking the respective interrupt service routines associated with the signals (step 518). If no signals were pending (step 512), then the stub routine invokes the desired library routine (step 514). In the example invocation stack 702 of FIG. 9B, the stub routine 1008 invokes the library routine 1006.

In a preferred embodiment, the present invention allows the signal safing decisions discussed above to be overridden using conventional methods. For example, the determination for signal safing discussed above can be controlled by setting a flag to explicitly specify when interrupts are to be deferred. This allows more granular (that is, at the instruction level, rather than at the routine level) signal safing decision to be implemented, where desired. If the flag is not set, then the signal safing procedure discussed above with reference to the flowcharts 102, 302, 402, and 502 in FIGS. 1, 3, 4, and 5, respectively, are performed.

According to an alternate embodiment of the present invention, the present invention represents a computer program product that includes a computer readable medium having computer program logic recorded thereon. The computer program logic enables a computer system to process asynchronous interrupts in a safe manner, as discussed above.

While the invention has been particularly shown and described with reference to preferred embodiments thereof, it will be understood by those skilled in the art that the foregoing and other changes in form and details may be made therein without departing from the spirit and scope of the invention.

Having thus described our invention, what we claim as new and desire to secure by Letters Patent is:

1. A computer program product for use in a computer system, said computer program product comprising:

a computer usable medium having computer readable program code means embodied in said medium for enabling a computer system to process an asynchronous signal directed to a thread comprising a software routine executing in the computer system such that data consistency is maintained, said computer readable program code means comprising:

signal safe determining computer readable program code means for enabling the computer system to determine whether the routine is signal safe such that processing of the routine may be interrupted in order to process the signal without possibly causing inconsistency of data;

computer readable program code means for enabling the computer system to asynchronously interrupt the routine and process the signal immediately if the routine is signal safe; and deferring computer readable program code means for enabling the computer system to defer processing of the signal if the routine is not signal safe to a time when the signal may be processed without possible causing inconsistency of data.

2. The computer program product of claim 1, wherein said signal safe determining computer readable program code means comprises:

computer readable program code means for enabling the computer system to determine whether the routine is part of a user written application program;

conformance determining computer readable program code means for enabling the computer system to determine whether the routine is capable of enabling and disabling asynchronous interrupts;

computer readable program code means for enabling the computer system to conclude that the routine is signal safe if it is determined that the routine is part of a user written application program and the routine is capable of enabling and disabling asynchronous interrupts;

computer readable program code means for enabling the computer system to conclude that the routine is not signal safe if it is determined that the routine is not part of a user written application program; and computer readable program code means for enabling the computer system to conclude that the routine is not signal safe if it is determined that the routine is not capable of enabling and disabling asynchronous signals.

3. The computer program product of claim 2, wherein the computer system includes an operating system that conforms to an operating system interface standard that defines functions for enabling and disabling asynchronous interrupts, wherein said conformance determining computer readable program code means comprises:

computer readable program code means for enabling the computer system to determine whether the routine is written in a computer programming language that conforms to the operating system interface standard; and computer readable program code means for enabling the computer system to conclude that the routine is capable of enabling and disabling asynchronous interrupts if it is determined that the routine is written in a computer programming language that conforms to the operating system interface standard.

4. The computer program product of claim 1, wherein said signal safe determining computer readable program code means comprises:

computer readable program code means for enabling the computer system to determine whether the routine is from a run-time software library; and computer readable program code means for enabling the computer system to conclude that the routine is not signal safe if it is determined that the routine is from a run-time software library.

5. The computer program product of claim 1, wherein the computer system includes an invocation stack comprising a plurality of stack frames, the stack frames associated with routines executing in the computer system, and in which a stub routine is maintained in the computer system, the stub routine when invoked in the computer system enabling the computer system to process any deferred signals, wherein said deferring computer readable program code means comprises:

searching computer readable program code means for enabling the computer system to search for a signal safe routine associated with one of the stack frames in the invocation stack; and computer readable program code means for enabling the computer system to insert, if a signal safe routine is found by said searching means, a new stack frame associated with the stub routine into a return mechanism of the invocation stack, such that the stub routine is invoked just prior to returning to the signal safe routine found by said searching means.

6. The computer program product of claim 5, in which a second stub routine is maintained in the computer system, the second stub routine when invoked in the computer system enabling the computer system to process and deferred signals, and in which the computer system also includes a library invocation mechanism which is accessed whenever any signal safe routine invokes any library function, wherein said deferring computer readable program code means comprises:

computer readable program code means for enabling the computer system to modify, if a signal safe routine is not found by said searching means, the library invocation mechanism to refer to the second stub routine, such that the second stub routine is invoked whenever any signal safe routine attempts to invoke any library function, the second stub routine also enabling the computer system to restore the library invocation mechanism after the second stub routine has been invoked.

7. A program storage device readable by a machine, tangibly embodying a program of instruction executable by the machine to perform method steps for processing an asynchronous signal directed to a thread comprising a software routine executing in a computer system such that data consistency is maintained, said method steps comprising:

(1) determining whether the routine is signal safe such that processing of the routine may be interrupted in order to process the signal without possibly causing inconsistency of the data;

(2) asynchronously interrupting the routine and processing the signal immediately if the routine is signal safe; and (3) deferring processing of the signal if the routine is not signal safe to a time when the signal may be processed without possibly causing inconsistency of data.

8. The program storage device of claim 7, wherein method step (1) comprises the method steps of:

(a) determining whether the routine is part of a user written application program;

(b) determining whether the routine is capable of enabling and disabling asynchronous interrupts;

(c) concluding that the routine is signal safe if it is determined that the routine is part of a user written application program and the routine is capable of enabling and disabling asynchronous interrupts;

(d) concluding that the routine is not signal safe if it is determined that the routine is not part of a user written application program; and (e) concluding that the routine is not signal safe if it is determined that the routine is not capable of enabling and disabling asynchronous interrupts.

9. The program storage device of claim 8 in which the computer system includes an operating system that conforms to an operating system interface standard that defines functions for enabling and disabling asynchronous interrupts, wherein method step (b) comprises the method steps of:

determining whether the routine is written in a computer programming language that conforms to the operation system interface standard; and concluding that the routine is capable of enabling and disabling asynchronous interrupts if it is determined that the routine is written in a computer programming language that conforms to the operating system interface standard.

10. The program storage device of claim 7, wherein method step (1) comprises the method steps of:

determining whether the routine is from a run-time software library; and concluding that the routine is not signal safe if it is determined that the routine is from a run-time software library.

11. The program storage device of claim 7, in which the computer system includes an invocation stack comprising a plurality of stack frames, the stack frames associated with routines executing in the computer system, and in which a stub routine is maintained in the computer system, the stub routine when invoked in the computer system enabling the computer system to process any deferred signals, wherein method step (3) comprises the method steps of:

(a) searching for a signal safe routine associated with one of the stack frames in the invocation stack; and (b) if a signal safe routine is found in method step (a), then inserting a new stack frame associated with the stub routine into a return mechanism of the invocation stack such that the stub routine is invoked just prior to returning to the signal safe routine found in step (a).

12. The program storage device of claim 11, in which a second stub routine is maintained in the computer system, the second stub routine when invoked in the computer system enabling the computer system to process any deferred signals, and in which the computer system also includes a library invocation mechanism which is accessed whenever any signal safe routine invokes any library function, wherein method step (3) further comprises the method step of:

(c) if a signal safe routine is not found in method step (a), then modifying the library invocation mechanism to refer to the second stub routine such that the second stub routine is invoked whenever andy signal safe routine attempts to invoke any library function, the second stub routine also enabling the computer system to restore the library invocation mechanism after the second stub routine has been invoked.

* * * * *